United States Patent [19]

Ohmori et al.

[11] Patent Number: 4,644,043
[45] Date of Patent: Feb. 17, 1987

[54] FLUORINE-CONTAINING POLYMER FOR GAS SEPARATING MEMBRANE

[75] Inventors: Akira Ohmori, Ibaraki; Takashi Yasuhara, Settsu; Naoaki Izutani, Takatsuki; Yasufumi Ueda, Sakai, all of Japan

[73] Assignee: Daikin Industries Ltd., Japan

[21] Appl. No.: 792,570

[22] Filed: Oct. 29, 1985

[30] Foreign Application Priority Data

Nov. 2, 1984 [JP] Japan ................. 59-232192

[51] Int. Cl.[4] .............................. C08F 14/18
[52] U.S. Cl. ........................................ 526/246
[58] Field of Search ............................. 526/246

[56] References Cited

U.S. PATENT DOCUMENTS 4,259,407 3/1981 Tada et al. ................ 526/246

*Primary Examiner*—Paul R. Michl
*Attorney, Agent, or Firm*—Larson and Taylor

[57] ABSTRACT

This invention provides a polymer of α-fluoroacrylate derivative having a structural unit represented by the formula

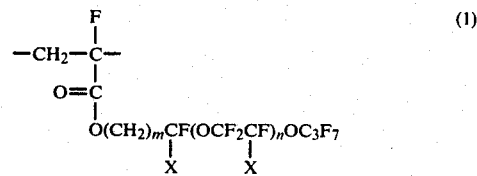

wherein X is fluorine or fluoroalkyl having 1 to 3 carbon atoms, m is an integer of 1 to 3 and n is an integer of 0 to 5.

4 Claims, No Drawings

FLUORINE-CONTAINING POLYMER FOR GAS SEPARATING MEMBRANE

This invention relates to a novel fluorine-containing polymer useful as a material for gas separating membrane.

It has been conventional practice to separate oxygen from air with a gas separating membrane for use in combustion, therapy, fermentation, etc.

Heretofore known as such gas separating membranes are those, for example, formed from a compound prepared by reacting ethyl cellulose or the like with $CF_3CF_2CF_2OCF(CF_3)COF$ (Japanese Unexamined Patent Publication No. 92449/1983). These membranes have been produced in order to enhance the permeability coefficient and separation coefficient of oxygen of a conventional gas separating membrane prepared from polydimethylsiloxane, natural rubber, ethyl cellulose, polyethylene, butyl rubber or like conventional materials, thereby improving the function of the membrane. Nevertheless, the gas separating membranes with the function thus improved have the drawback of being susceptible to hydrolysis in the presence of water.

To overcome the drawback of these gas separating membranes, we developed a gas separating membrane comprising a polymer having a structural unit represented by the formula

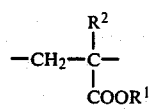

wherein $R^1$ is fluoroalkyl or oxygen containing fluoroalkyl, and $R^2$ is hydrogen or methyl, and then we filed an application for a patent of the new membrane in Japan (Patent Application No. 226617/1983).

The gas separating membrane developed by us is high in both permeability coefficient and separation coefficient of oxygen and chemically stable, but has low pressure resistance and remains to be improved in mechanical strength for use.

It is an object of this invention to provide a novel polymer useful for preparing a gas separating membrane which has a high permeability coefficient and a great separation coefficient of oxygen and which is chemically stable and outstanding in mechanical strength.

Other objects and features of the invention will become apparent from the following description.

This invention provides a polymer of α-fluoroacrylate derivative having a structural unit represented by the formula

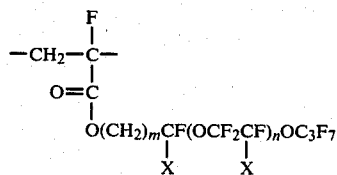

wherein X is fluorine or fluoroalkyl having 1 to 3 carbon atoms, m is an integer of 1 to 3 and n is an integer of 0 to 5.

The polymer of this invention having the foregoing structural unit may optionally have up to 50% by weight, preferably 40 to 50% by weight, of a functional group-containing structural unit represented by the formula

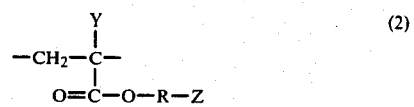

wherein Y is hydrogen, fluorine or methyl, R is alkylene having 1 to 5 carbon atoms or fluoroalkylene, and Z is hydroxyl, glycidyl or carboxyl, and/or a functional group-containing structural unit represented by the formula

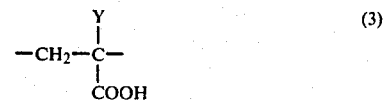

wherein Y is as defined above.

The polymer of this invention has a weight average molecular weight ranging from about 500,000 to about 1,500,000 as measured by gel permeation chromatography using polystyrene as the standard.

The polymer of this invention can be usually prepared by homopolymerizing a monomer of α-fluoroacrylate derivative represented by the formula

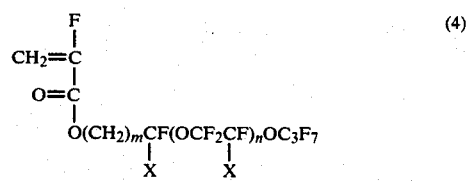

wherein X, m and n are as defined above or by copolymerizing a functional group containing monomer represented by the formula

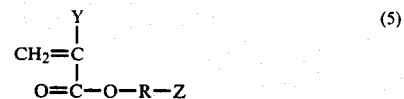

wherein Y, R and Z are as defined above or a functional group-containing structural unit represented by the formula

wherein Y is as defined above with the monomer of α-fluoroacrylate derivative of the formula (4).

Besides the monomers of the formulas (5) and (6), other ethylenically unsaturated compound can be copolymerized with the monomer of the formula (4) insofar as the properties of the α-fluoroacrylate derivative polymer of this invention are not impaired.

When the polymer of the invention is prepared by copolymerizing the monomer of the formula (4) with the functional group-containing monomer of the formula (5) and/or (6), it is preferred to use at least 50% by weight of the monomer of the formula (4) based on all the monomers in order to preclude the formation of a gas separating membrane having a reduced mechanical strength and a lower permeability coefficient. The polymer of α-fluoroacrylate derivative is obtained, for example, by conventional methods of solution, suspension, emulsion, bulk or mass polymerization.

Generally solution polymerization is resorted to because the the polymer then obtained need not be dissolved in a solvent again for the preparation of a gas separating membrane.

Examples of solvents which are usually used for solution or suspension polymerization are those containing fluorine, such as m-xylene hexafluoride, 1,1,2 trichloro-1,2,2-trifluoroethane, 1,2,4,4-tetrachloro-1,2,3,3,4-hexafluorobutane and the like. These fluorine-containing solvents are usable as mixed with a hydrocarbon solvent.

Examples of initiators useful for solution, suspension, bulk or mass polymerization are organic peroxides such as benzoyl peroxide, dicumyl peroxide, tertiary butyl peroxyisobutyrate and diisopropyl peroxydicarbonate, and azo compounds such as azobisisobutyronitrile and azobisisovaleronitrile. Examples of useful initiators for emulsion polymerization are oxidizing agents such as ammonium persulfate and potassium persulfate, and redox initiators comprising such an oxidizing agent, sodium sulfite or like reducing agent and iron (II) sulfate or like salt of transition metal.

The polymerization initiator is used usually in an amount of about 0.1 to about 5% by weight based on all the monomers.

The polymerization temperature is about 0 to about 150° C. for any case of polymerization.

The polymer of α-fluoroacrylate derivative prepared by one of the foregoing polymerization methods is dissolved in one of the solvents exemplified above with respect to the solution polymerization to obtain a polymer solution. When prepared by solution polymerization, the polymer is already in the form of a solution, which is used as suitably concentrated or diluted before use. With or without addition of a crosslinking agent, the polymer solution is then applied to a smooth-surfaced plate of glass, metal or the like or to a porous substrate of polytetrafluoroethylene or the like by a conventional film forming method, for example, by bar coater, spin coater, dipping or Langmuir method to form a membrane which is generally about 1 to about 50 μm in thickness. When formed on the smooth-surfaced plate of glass, metal or the like, the polymer membrane is reacted with a crosslinking agent to improve the mechanical strength, peeled off the plate and used as a gas separating membrane as fixed to a suitable substrate. Alternatively when formed on the porous substrate, the polymer membrane is treated for crosslinking to enhance the mechanical strength, and used as a gas separating membrane as adhered to the substrate.

The crosslinking agent can be used to cross-link the polymer and give enhanced mechanical strength to the gas separating membrane to be formed when the the polymer of α-fluoroacrylate derivative contains one or more functional groups such as carboxyl, hydroxyl or glycidyl. Examples of crosslinking agents which are generally useful when the functronal group is carboxyl are compounds having at least two amino groups, glycidyl groups or isocyanate groups, such as ethylene diamine, hexamethylenediamine, butylene diglycidyl ether,

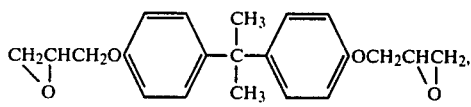

hexamethylene diisocyanate trimer and tolylene diisocyanate, etc. Examples of crosslinking agents which are usable when the functional group is hydroxyl are compounds having at least two isocyanate groups and exemplified above and compounds having at least two acid halides such as hexamethylene dicarbonyl chloride and the like. Examples of crosslinking agents which are useful when the functional group is glycidyl are compounds having at least two amino groups and exemplified above and Lewis acids, especially BF₃ or compounds capable of producing BF₃, such as

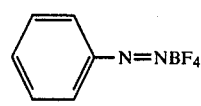

which produces BF₃ when subjected to the action of HCl or irradiated with light and BF₃·C₂H₅NH₂ complex which forms BF₃ when heated; acid anhydrides such as phthalic anhydride and the like; prepolymers of amino resins; methlolated melamine, etc.

The crosslinking reaction is conducted at a temperature between room temperature and about 200° C. for about 30 minutes to about 7 days.

The polymers of α-fluoroacrylate derivatives according to this invention are useful, because of their high permeability coefficient for oxygen, as a material for gas separating membrane for increasing the oxygen content or contact lenses. The polymers of the invention are also usable as optical cladding materials in view of their high transparency and low index of refraction. They also find applications as water and oil repellents, ink repellents and electrifying materials useful as toners.

Given below are Reference Examples for preparation of monomers of α-fluoroacrylate derivatives and Examples for preparation of polymers of α-fluoroacrylate derivatives from such monomers for use as gas separating membranes.

REFERENCE EXAMPLE 1

A 283.2 g (0.82 mol) quantity of

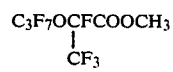

and 25 g (0.66 mol) of LiAlH were reacted in 500 cc of diethyl ether at 34° C. The reaction mixture thus obtained was neutralized with 18% hydrochloric acid. The oil layer was separated and distilled off, giving 197 g (0.62 mol) of

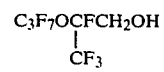

having a boiling point of 114° C./760 mmHg.

The alcohol obtained above was reacted with 65.6 g of CH₂=CFCOF in the presence of an equimolecular amount of triethylamine at 0° C., affording 275.6 g (0.70 mol) of

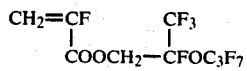

having a boiling point of 68.5° C./26 mmHg.

The result of $^{19}$F-nuclear magnetic resonance (NMR) analysis is shown below. The fluorine atoms are represented by letters a to f appearing in the following formula.

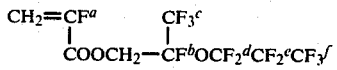

a: 41.4 ppm, b: 57.4 ppm, c: 5.9 ppm, d: 4.8 ppm, e: 52.6 ppm, f: 4.4 ppm.

The external standard was $CF_3COOH$ and the side of high magnetic field was positive.

REFERENCE EXAMPLE 2

A 403.6 g (0.81 mol) quantity of

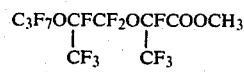

and 25 g (0.66 mol) of $LiAlH_4$ were reacted in 500 cc of diethyl ether at 34° C. The reaction mixture thus obtained was neutralized with 18% hydrochloric acid. The oil layer was separated and distilled off, giving 273.3 g (0.57 mol) of

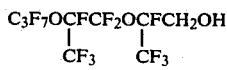

having a boiling point of 156° C./760 mmHg. The alcohol obtained above was reacted with 60.7 g (0.66 mol) of $CH_2=CFCOF$ in the presence of an equimolecular amount of triethylamine at 0° C., afford affording 310 g (0.56 mol) of

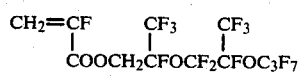

having a boiling point of 64° C./7 mmHg.

The result of F-nuclear magnetic resonance (NMR) analysis is shown below. The fluorine atoms are represented by letters a to i appearing in the following formula.

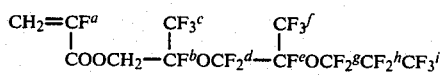

a: 41.4 ppm, b: 57.4 ppm, c: 6.2 ppm, d: 3.9–4.5 ppm, e: 67.9 ppm, f: 4.8 ppm, g: 3.9–4.5 ppm, h: 52.8 ppm, i: 3.3 ppm.

The external standard was $CF_3COOH$ and the side of high magnetic field was positive.

EXAMPLES 1 and 2

A 15 g quantity of each monomer of α-fluoroacrylate derivative as listed below in Table 1 and 0.15 g of azobisisobutyronitrile were maintained at 60° C. for 24 hours to undergo bulk or mass polymerization.

The resulting reaction mixture was mixed with petroleum ether. The precipitate was filtered and dried under a reduced pressure at 50° C. for 24 hours, affording 12.8 g of a polymer in Example 1 (14 g of a polymer in Example 2).

The glass transition temperatures (TG) of the polymers obtained in Examples 1 and 2 were measured by a differential scanning calorimeter while elevating the temperature at a rate of 20° C./min and were 74° C. and 53° C., respectively.

The thermal decomposition temperatures of the polymers obtained in Examples 1 and 2 were measured in air (while elevating the temperature at a rate of 10° C./min) by a device for simultaneously conducting differential thermal analysis and thermogravimetric analysis and were 295° and 301° C., respectively.

$^{19}$F-NMR analysis of the polymers revealed that the polymers had no signal of α-position fluorine at 41.4 ppm but exhibited the signal of fluorine bonded to saturated carbon at 90 ppm.

The polymers were analyzed by infrared absorption. The analysis showed the absorbance at 1330 to 1350 $cm^{-1}$ due to $-CF_3$, at 1100 to 1280 $cm^{-1}$ due to $-CF_2-$ or $-CF-$, at 1770 $cm^{-1}$ due to ester group, at 990 to 1250 $cm^{-1}$ due to ether group, but no absorbance at 1660 $cm^{-1}$ due to double bond found in the monomers.

The polymers prepared above were soluble in a fluorine solvent such as m-xylene hexafluoride and trichlorotrifluoroethane, but were swollen with a hydrocarbon solvent such as acetonitrile, dimethylformamide, ethyl acetate, methyl ethyl ketone and methanol and were insoluble in water.

The ultimate viscosity values ($\eta$) of the polymers obtained in Examples 1 and 2 were measured by an Ostwald's viscometer at 35° C. using m-xylene hexafluoride as a solvent and were 0.9 and 0.7, respectively.

The molecular weights of the polymers obtained in Examples 1 and 2 were measured by gel permeation chromatography at 150° C. using m-xylene hexafluoride as a solvent and with use of a device of Waters Co. and Trymodal Column Kit as a column, product of Du Pont and were 10,000 to 5,000,000, respectively. The weight average mean molecular weights of the polymers prepared in Examples 1 and 2 were 1,230,000 and 1,060,000, respectively and the polydispersities thereof were 5.3 and 4.6, respectively.

To 1 g of each polymer were added 70 g of 1,1,2-trichloro 1,2,2 -trifluoroethane and 30 g of m-xylene hexafluoride to obtain a uniform solution. The solution was sprayed over a porous substrate ("Duraguard 2400," trademark, product of Polyplastic Kabushiki Kaisha) by a spin coater rotating at 2,000 rpm, dried and cut to a diameter of 150 mm to obtain a specimen of gas separating membrane.

The membrane specimens thus prepared were tested for permeability coefficient and separation coefficient for nitrogen and for oxygen were determined under the following conditions according to ASTM 1434 (V method):

Gas used: standard mixture of 79 vol. % of nitrogen and 21 vol. % of oxygen

Test pressure: primary pressure 4 kg/cm$^2$ secondary pressure 1 kg/cm$^2$

Amount of permeation of gas: 4 cc

Testing time: time taken for the permeation of gas (sec.) through the membrane specimen Thickness of membrane: value obtained by dividing the weight of the polymer by the area of the polymer and the specific gravity of the polymer The composition of the gas which had permeated through the membrane was analyzed by gas chromatography. Table 1 below shows the results.

EXAMPLES 3 and 4

The same polymers as those prepared in Examples 1 and 2 were dissolved in a solvent of the same composition as that of the foregoing solvent to provide a solution having a concentration of 10% by weight. The solution was applied to a glass plate by a doctor blade to a thickness of 40 um when liquid. The glass plate thus coated was dried in air and immersed in methanol to peel the membrane off the glass plate. The membrane was dried in air on "Duraguard 2500" (trademark, product of Polyplastic Kabushiki Kaisha, 0.04 μm in breadth, 0.4 μm in length) to give a specimen of gas separating membrane. The two specimens thus obtained were tested for the two coefficients with the results as indicated below in Table 1.

COMPARISON EXAMPLE 1

A gas separating membrane was prepared by the same procedure as in Example 1 except that the monomer as shown below in Table 1 was used in place of the monomers used in Example 1. The membrane thus prepared was checked for the two coefficients with the result listed below in Table 1. An attempt was made to prepare a gas separating membrane in the same manner as in Examples 3 and 4, but resulted in rupture of the coating formed on a glass plate because of its low strength when peeled off the plate.

The membrane specimens obtained in Examples 1 to 4 and in Comparison Example 1 were pressurized for pressure resistance test. The test revealed that the specimen of Comparison Example 1 became broken when subjected to a pressure of 3.5 kg/cm² G whereas the specimens of Examples 1 to 4 remained intact under a pressure of even 5 kg/cm² G.

TABLE 1

| | Monomer | Dry thickness (μm) | Permeability coefficient for oxygen (× 10⁻¹⁰) | Separation coefficient for oxygen/nitrogen |
|---|---|---|---|---|
| Example 1 | i | 1.6 | 70 | 3.0 |
| Example 2 | ii | 2.7 | 130 | 2.8 |
| Example 3 | i | 2.1 | 86 | 3.1 |
| Example 4 | ii | 2.5 | 150 | 2.8 |
| Comp. Ex. 1 | iii | 2.6 | 43 | 3.7 |

(Note) The unit of the permeability coefficient used in Table 1 was cc cm/cmHg sec cm², and the monomer (i) $CH_2=\overset{F}{\underset{|}{C}}COOCH_2\overset{CF_3}{\underset{|}{C}}FOC_3F_7$, monomer (ii) $CH_2=\overset{F}{\underset{|}{C}}COOCH_2\overset{CF_3}{\underset{|}{C}}FOCF_2\overset{CF_3}{\underset{|}{C}}FOC_3F_7$, and monomer (iii) $CH_2=\overset{CH_3}{\underset{|}{C}}COOCH_2\overset{CF_3}{\underset{|}{C}}FOCF_2\overset{CF_3}{\underset{|}{C}}FOC_3F_7$.

EXAMPLE 5

A mixture of 1.9 g of

(hereinafter referred to as 5F), 13.1 g of

(i) and 0.15 g of azobisisobutyronitrile was placed in a glass tube which was then sealed under a reduced pressure and set in a constant temperature bath at 60° C. for 5 hours. The reaction mixture thus obtained was mixed with petroleum ether and the precipitated polymer was dried at 50 to 75° C. under a reduced pressure for 24 hours to give 12.5 g of the polymer. The polymer thus produced was analyzed by ¹⁹F-NMR to obtain a composition mole ratio of the monomers which was 18.2/81.8 as calculated from the integrator readings of signals for —CH₂CF₂*CF₃ and —CF₂CF₂*CF₃ (asterisked part) contained in the monomers.

Tg and (η) as measured by the same procedures as above were 85° C. and 1.2, respectively.

A specimen of gas separating membrane was prepared from the polymer thus produced and was tested for permeability coefficient and separation coefficient for oxygen and nitrogen. Table 2 below lists the results.

EXAMPLE 6

The same procedure as in Example 5 was repeated except that 13.1 g of

was used in place of

to produce 10.8 g of a polymer.

Tg and (η) as measured by the same procedures as above were 76.5° C. and 1.0, respectively.

The polymer thus obtained was analyzed by ¹⁹F-NMR which revealed that the composition mole ratio of the monomers (5F) to (ii) was 24/75.9.

A specimen of gas separating membrane was prepared from the polymer obtained above and tested for permeability coefficient and separation coefficient for oxygen and nitrogen with the results listed below in Table 2.

TABLE 2

| | Dry thickness (μm) | Permeability coefficient for oxygen (×10⁻¹⁰) | Separation coefficient for oxygen/nitrogen |
|---|---|---|---|
| Ex. 5 | 3.0 | 47 | 3.1 |
| Ex. 6 | " | 90 | 3.2 |

EXAMPLES 7 TO 10

Polymers were prepared from the two kinds of monomers as shown below in Table 3 by the same procedures as in Examples 5 and 6 in yields of 90, 80, 95 and 92% in Examples 7 to 10, respectively.

In Examples 7 to 10, Tg values were 51°, 68°, 78° and 64° C. and (η) values 0.8, 1.0, 1.5 and 0.9, repectively.

Specimens of gas separating membrane were produced from the polymers thus prepared in the same manner as in Examples 1 and 2 and tested for permeability coefficient and separation coefficient with the results as listed below in Table 3.

EXAMPLE 11

A polymer was prepared from the monomers shown below in Table 3 in the same manner as in Examples 5 and 6. Tg was 78° C. and (η) 1.3.

The polymer thus obtained was dissolved in m-xylene hexafluoride to obtain a solution having a concentration of 20 %. To 50 g of the solution was added 0.17 g of hexamethylene diisocyanate. The mixture was applied to a substrate ("Duraguard") by the same procedure as in Examples 1 and 2 and the coated substrate was heated to 70° C. for 24 hours to crosslink the polymer, giving a specimen of gas separating membrane which was checked for the two coefficients with the results shown below in Table 3.

TABLE 3

| Mono-mer | Composition ratio (by mole) | Dry thickness (μm) | Permeability coefficient for oxygen (× 10⁻¹⁰) | Separation coefficient for oxygen |
|---|---|---|---|---|
| Ex. 7 | i & iii | 50/50 | 4.6 | 50 | 3.5 |
| Ex. 8 | i & v | 95/5 | 5.3 | 38 | 3.4 |
| Ex. 9 | i & vi | 90/10 | 5.0 | 55 | 3.2 |
| Ex. 10 | i & ii | 50/50 | 2.7 | 105 | 3.0 |
| Ex. 11 | i & iv | 95/5 | 5.1 | 40 | 3.3 |

(Note) The monomers (i) to (iii) are the same as those defined above. The monomers (iv), (v) and (vi) are

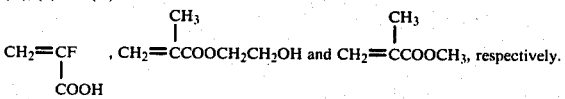

, $CH_2=CCOOCH_2CH_2OH$ and $CH_2=CCOOCH_3$, respectively.

We claim:

1. An α-fluoroacrylate polymer comprising:
   (1) 50 to 100% by weight of a structural unit represented by the formula

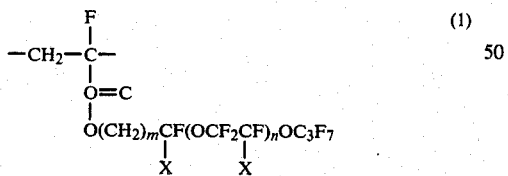
(1)

wherein X is fluorine or fluoroalkyl having 1 to 3 carbon atoms, m is an integer of 1 to 3 and n is an integer of 0 to 5, and
   (2) up to 50% by weight of at least one of (i) a structural unit represented by the formula

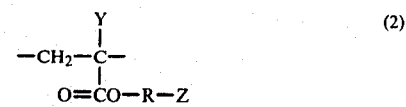
(2)

wherein Y is hydrogen, fluorine or methyl, R is alkylene having 1 to 5 carbon atoms or fluoroalkylene and Z is hydroxyl, glycidyl or carboxyl, and
   (ii) a structural unit represented by the formula

(3)

wherein Y is as defined above.

2. A polymer as defined in claim 1 which has a weight average molecular weight of about 500,000 to about 1,500,000 as measured by gel permeation chromatography.

3. A gas separating membrane consisting essentially of α-fluoroacrylate polymer comprising:
   (1) 50 to 100% by weight of a structural unit represented by the formula

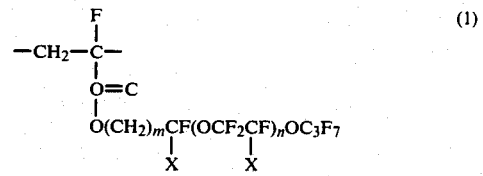
(1)

wherein X is fluorine or fluoroalkyl having 1 to 3 carbon atoms, m is an integer of 1 to 3 and n is an integer of 0 to 5, and
   (2) up to 50% by weight of at least one of (i) a structural unit represented by the formula

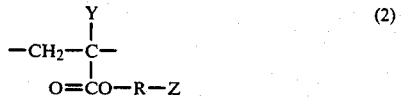
(2)

wherein Y is hydrogen, fluorine or methyl, R is alkylene having 1 to 5 carbon atoms or fluoroalkylene and Z is hydroxyl, glycidyl or carboxyl, and
   (ii) a structural unit represented by the formula

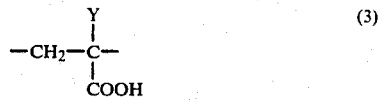
(3)

wherein Y is as defined above.

4. A gas separating membrane as defined in claim 3 which comprises a polymer having a weight average molecular weight of about 500,000 to about 1,500,000 as measured by gel permeation chromatography.

* * * * *